United States Patent
Harpur et al.

(10) Patent No.: US 10,091,011 B2
(45) Date of Patent: *Oct. 2, 2018

(54) SYSTEM FOR DIFFERENTIAL NOTIFICATION

(71) Applicant: International Business Machines Corporation, Armonk, NY (US)

(72) Inventors: Liam Harpur, Dublin (IE); Brian O'Donovan, Dublin (IE); Enda Sexton, Wicklow (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,249

(22) Filed: Dec. 6, 2017

(65) Prior Publication Data

US 2018/0097649 A1  Apr. 5, 2018

Related U.S. Application Data

(63) Continuation of application No. 15/241,323, filed on Aug. 19, 2016.

(51) Int. Cl.
   *G06F 15/16*   (2006.01)
   *H04L 12/18*   (2006.01)
   *H04L 12/58*   (2006.01)

(52) U.S. Cl.
   CPC .......... *H04L 12/1822* (2013.01); *H04L 51/04* (2013.01); *H04L 51/16* (2013.01)

(58) Field of Classification Search
   None
   See application file for complete search history.

(56) References Cited

U.S. PATENT DOCUMENTS

| | | |
|---|---|---|
| 8,103,726 B2 | 1/2012 | Stoddard et al. |
| 2008/0222531 A1 | 9/2008 | Davidson et al. |

(Continued)

FOREIGN PATENT DOCUMENTS

WO    2015131122 A2    9/2015

OTHER PUBLICATIONS

Smilkov, "Understanding Email Communication Patterns", Massachusetts Institute of Technology, 2014, 49 pages.

(Continued)

*Primary Examiner* — Mohamed Ibrahim
(74) *Attorney, Agent, or Firm* — Reza Sarbakhsh; SVL IP Law (57) ABSTRACT

A method, a processing device, and a computer program product are provided. Discussions in threads are analyzed to learn patterns that occur before at least one respective additional party joins the discussions in the threads. A model of conversation states is created based on the analyzing. Thread updates and new threads are periodically analyzed, based on the model, to determine if a corresponding triggering condition occurred with respect to any new respective discussions of the threads or the new threads. The at least one respective additional party is notified to participate in a respective new discussion when the periodically analyzing determines that the corresponding triggering condition occurred with respect to the respective new discussion in a corresponding thread or a corresponding new thread.

6 Claims, 8 Drawing Sheets

(56) References Cited

U.S. PATENT DOCUMENTS

| | | | |
|---|---|---|---|
| 2010/0228777 A1* | 9/2010 | Imig | G06F 17/30699 |
| | | | 707/772 |
| 2010/0293475 A1 | 11/2010 | Nottingham et al. | |
| 2013/0027428 A1* | 1/2013 | Graham | H04L 51/32 |
| | | | 345/633 |
| 2015/0142888 A1* | 5/2015 | Browning | H04L 12/1831 |
| | | | 709/204 |
| 2015/0256495 A1 | 9/2015 | Claux et al. | |
| 2015/0350142 A1 | 12/2015 | Guenther et al. | |

OTHER PUBLICATIONS

List of IBM Patents or Patent Applications Treated as Related, Dec. 2017, 1 Page.

* cited by examiner

SYSTEM FOR DIFFERENTIAL NOTIFICATION

CROSS-REFERENCE TO RELATED APPLICATIONS

This application is a continuation of U.S. patent application Ser. No. 15/241,323, entitled "SYSTEM FOR DIFFERENTIAL NOTIFICATION" and filed Aug. 19, 2016, the disclosure of which is incorporated herein by reference in its entirety.

BACKGROUND

Present invention embodiments are related to systems, methods and computer program products for analyzing a discussion and notifying at least one additional party that it may be beneficial to have that at least one additional party involved in the conversation. In particular, present invention embodiments are related to systems, methods and computer program products for recognizing patterns in a discussion, determining when it would be beneficial to have at least one additional party involved in the discussion based on a recognized pattern, and notifying the at least one additional party when it would be beneficial for the least one additional party to become involved in the discussion.

Existing forum notification systems notify users about conversations that have already taken place by periodically sending a digest at regular time intervals, such as weekly, monthly, or some other time period. However, such forum notification systems are unable to make predictions regarding when specific individuals should become involved in a specific conversation.

SUMMARY

In a first aspect of various embodiments, a computer-implemented method is provided. At least one processing device analyzes discussions in threads to learn patterns that occur before at least one additional respective party joins the discussions in the threads. The at least one processing device creates a model of conversation states based on results of analyzing the discussions. Periodically, the at least one processing device analyzes thread updates and new threads, based on the model, to determine if a corresponding trigger condition occurred regarding any new discussions of the threads or the new threads. The at least one processing device notifies the at least one respective additional party to participate in a respective discussion when the periodically analyzing determines that the corresponding triggering condition occurred with respect to the respective new discussion in a corresponding thread or a corresponding new thread.

In a second aspect of various embodiments, a system is provided. The system includes at least one processor and at least one memory connected to the at least one processor. The at least one memory includes instructions stored therein to configure the at least one processor to: analyze discussions in threads to learn patterns that occur before at least one respective additional party joins the discussions in the threads; create a model of conversation states based on the analyzing; periodically analyze thread updates and new threads, based on the model, to determine if a corresponding triggering condition occurred with respect to any respective new discussions of the threads or the new threads; and notify the at least one respective additional party to participate in a respective new discussion when the periodically analyzing determines that the corresponding triggering condition occurred with respect to the respective new discussion in a corresponding thread or a corresponding new thread.

In a third aspect of various embodiments, a computer program product is provided. The computer program product includes at least one computer readable storage medium that has computer readable program code embodied therewith for execution on a processing system. The computer readable program code is configured to be executed by the processing system to: analyze discussions in threads to learn patterns that occur before at least one respective additional party joins the discussions in the threads; create a model of conversation states based on the analyzing; periodically analyze thread updates and new threads, based on the model, to determine if a corresponding triggering condition occurred with respect to any respective new discussions of the threads or the new threads; and notify the at least one respective additional party to participate in a respective new discussion when the periodically analyzing determines that the corresponding triggering condition occurred with respect to the respective new discussion in a corresponding thread or a corresponding new thread.

BRIEF DESCRIPTION OF THE DRAWINGS

Generally, like reference numerals in the various figures are utilized to designate like components.

DETAILED DESCRIPTION

Figure 1:
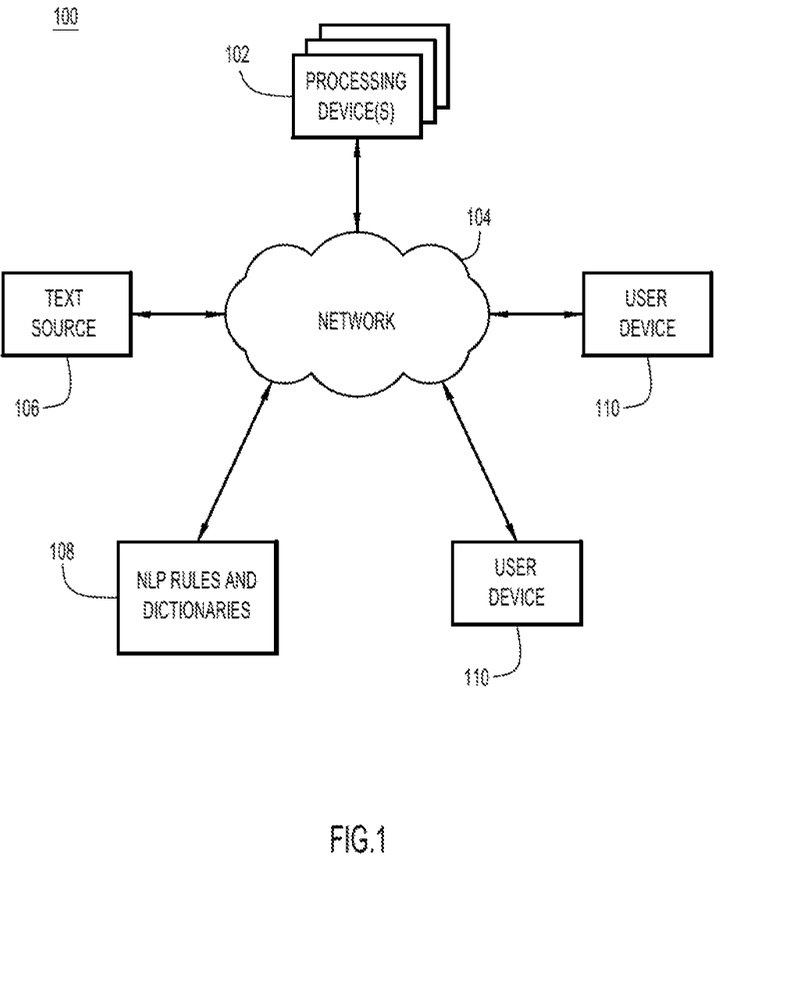
FIG. 1 illustrates an example environment in which embodiments may be implemented.

With reference now to FIG. 1, an example environment 100 for implementation of embodiments is shown. One or more processing devices 102 may receive input from a text source 106, either directly or via a network 104. The text source may include, but not be limited to, email, text messages or forum discussions. The one or more processing devices 102 may analyze text input from text source 106 using natural language processing (NLP) rules and dictionaries 108. Network 104 may be implemented by any number of any suitable communications media (e.g., wide area network (WAN), local area network (LAN), Internet, Intranet, etc.). In some embodiments, one or more processing devices 102 and natural language processing rules and dictionaries 108 may be local to each other and may communicate via any appropriate local communication medium (e.g., local area network (LAN), hardwire, wireless link, Intranet, etc.). A number of user devices 110 may be connected to network 104.

Figure 2:
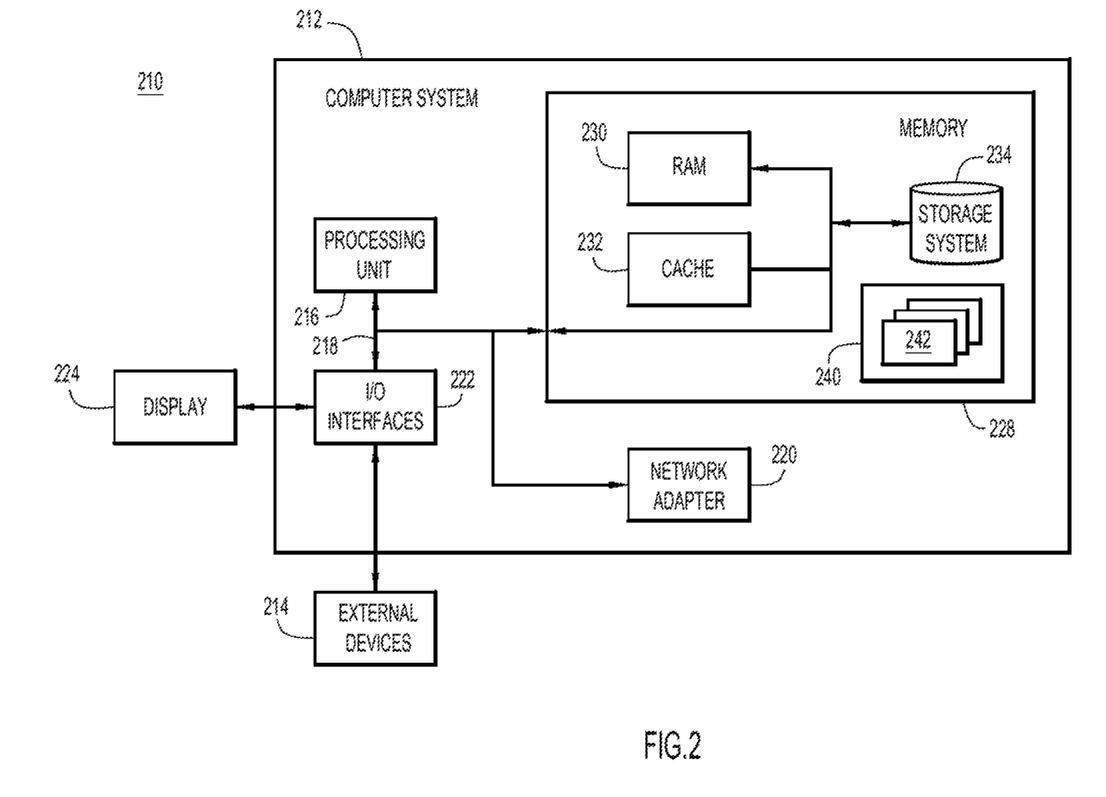
FIG. 2 illustrates an example of a processing device capable of performing functions of various embodiments.

Referring now to FIG. 2, a schematic of an example processing device 210, which may implement a processing device of one or more processing devices 102, is shown. Processing device 210 is only one example of a suitable processing device for the environment of FIG. 1 and is not intended to suggest any limitation as to the scope of use or functionality of embodiments of the invention described herein. Regardless, processing device 210 is capable of being implemented and/or performing any of the functionality set forth herein.

In processing device 210, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types. Computer system 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system 212 is shown in the form of a general-purpose computing device. Components of computer system 212 may include, but are not limited to, one or more processors or processing units 216, a system memory 228, and a bus 218 that couples various system components including system memory 228 to one or more processors 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and includes both volatile and non-volatile media, removable and non-removable media.

System memory 228 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 220. As depicted, network adapter 220 communicates with the other components of computer system 212 via bus 218. It should be understood that, although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
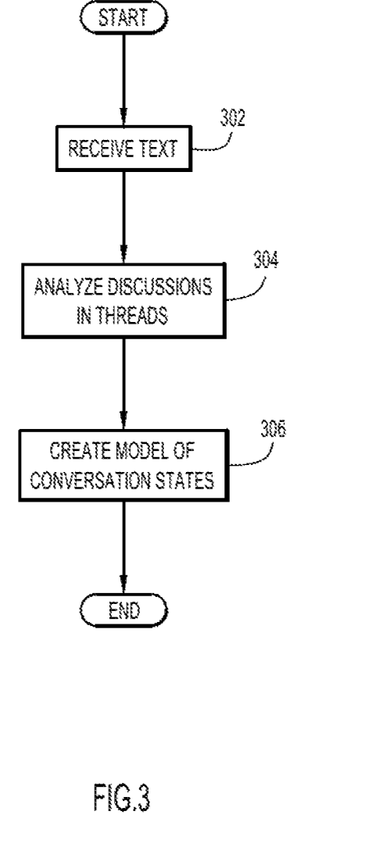
FIG. 3 is a flowchart that illustrates example processing that may be performed in embodiments during a training phase.

FIG. 3 is a flowchart of an example process, which may be performed in various embodiments during a training phase. The process may begin by receiving text discussions from a number of threads (act 302). The text may be received from a source including, but not limited to, emails, text messages and forum discussions. Each discussion may be analyzed to determine various patterns based on a number of items, including, but not limited to, a tone of the discussion, users involved in the discussion, a subject matter of the discussion, etc. (act 304).

Natural language processing, including text analytics, may be performed on the received text. The text analytics may use one or more predefined dictionaries and rules that identify, for example, a subject matter, whether any stressful language is used, dates, project phases, names of people, etc. The dictionaries and the rules are annotators and the result after analyzing the text are annotations.

One industry standard for context analytics is Unstructured Information Management Architecture (UIMA). UIMA is a component architecture and software framework implementation for the analysis of unstructured content such as text, video and audio data. UIMA includes software systems for analyzing large volumes of unstructured information in order to discover knowledge that is relevant to an end user. For example, a UIMA application may process text and identify entities, such as persons, places, organizations, or relations such as works-for or located-at. A UIMA pipeline is a list of individual stages, or Annotators, which are run serially. When a document is processed by the UIMA pipeline, a first annotator stage may create annotations covering sections of text. When the first stage is completed, the second annotator stage may then process the text. Each subsequent stage may read annotations created by earlier stages and may add or modify the annotations, thus building up a more complex analysis of contents of the document. The annotations could be for an entire document or discussion, a paragraph or sentence, a token or an annotation that one can define by creating a custom dictionary or a parsing rule including, but not limited to, names of project phases, individuals' names, etc.

Some examples of custom dictionaries may include a date dictionary having words including, but not limited to, today, yesterday, January, February, March, etc., and a project phase dictionary having words including, but not limited to, "Design Complete", "QE Complete", "Shipments begin", etc. Example rules may be as follows, where a token is any arbitrary word and "<token>*" implies any sequence of words not broken by any punctuation:
<Date><token>*<Project Phase>
<Project Phase><token>*<Date>
The above rules would match either a date word followed by a project phase word in a same sentence or a project phase word followed by a date word in the same sentence.

Conventional machine learning techniques may be employed in a correlation module engine in order to correlate users involved in a discussion with subject matter(s), project phase(s), triggering conditions, and one or more parties who later joined the discussion. The machine learning techniques may also be employed to discover various patterns that appear in the discussions.

Returning to the flowchart of FIG. 3, after analyzing the discussions in the threads, various patterns may have been observed, from which a model of conversation states may be derived (act 306). An example list of conversation states may include, but not be limited to:
 a first state for a conversation regarding a vague idea under discussion;
 a second state for a conversation regarding a definite idea looking for a sponsor;
 a third state for a conversation regarding a technical issue needing assistance;
 a fourth state for a conversation indicative of frustration and a readiness to cancel an order; and
 a sixth state for a conversation indicative of excitement regarding product possibilities.

Figure 4:
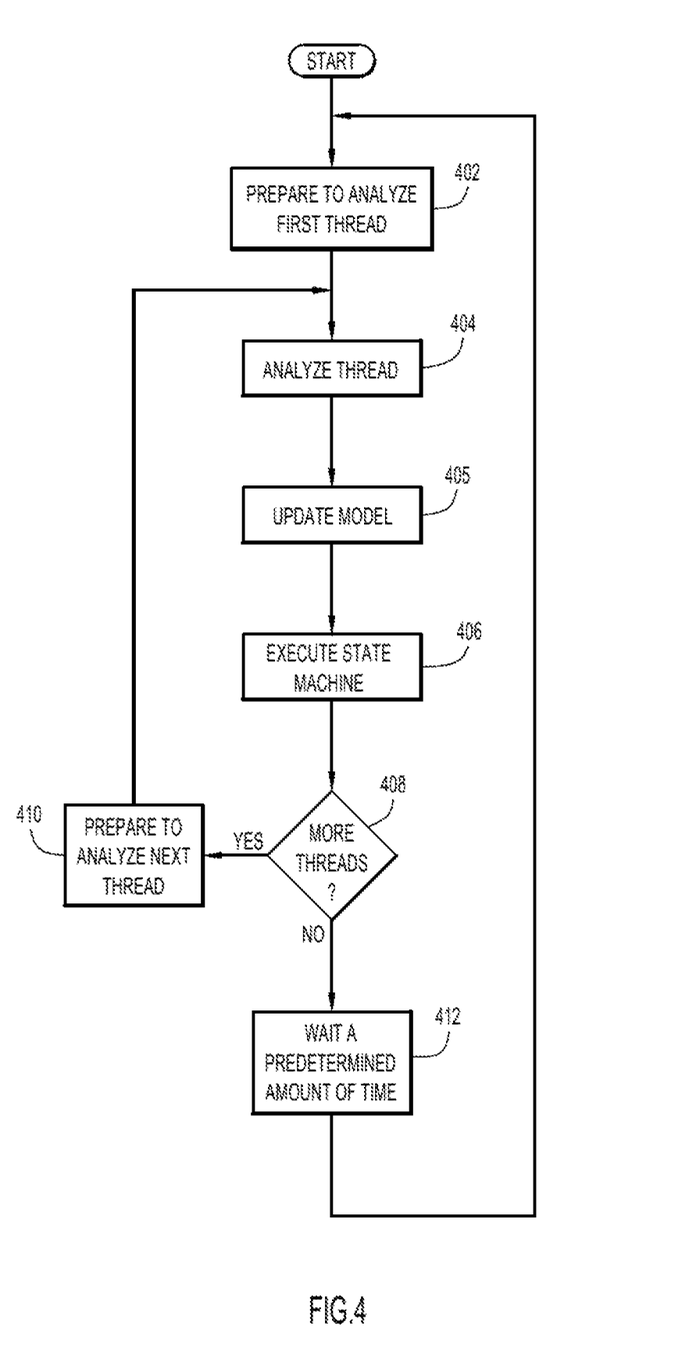
FIG. 4 is a flowchart that illustrates example processing that may be performed in embodiments during an operational phase.
Figure 5:
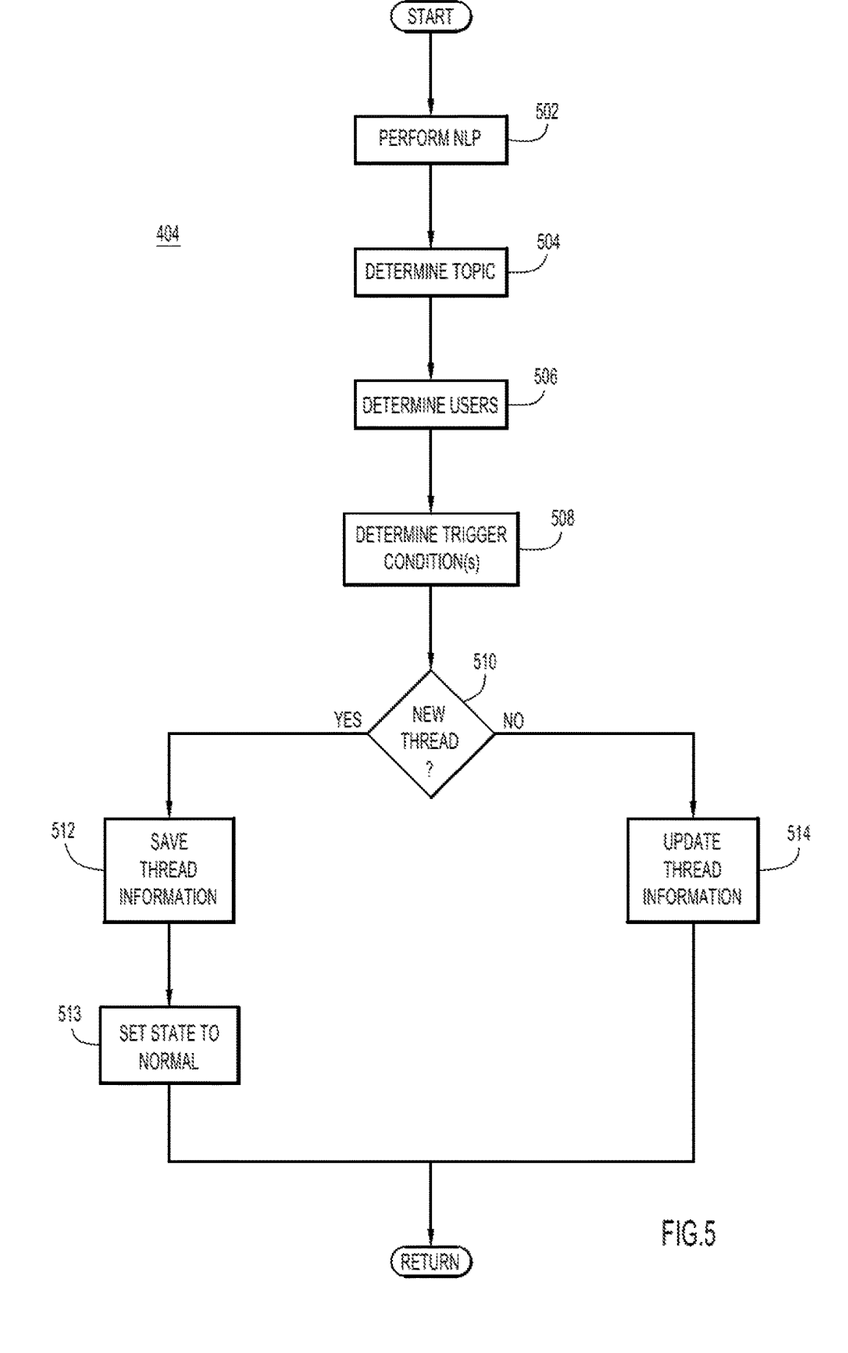
FIG. 5 is a flowchart that illustrates example processing that may be performed in embodiments during act 404 of FIG. 4.
Figure 6:
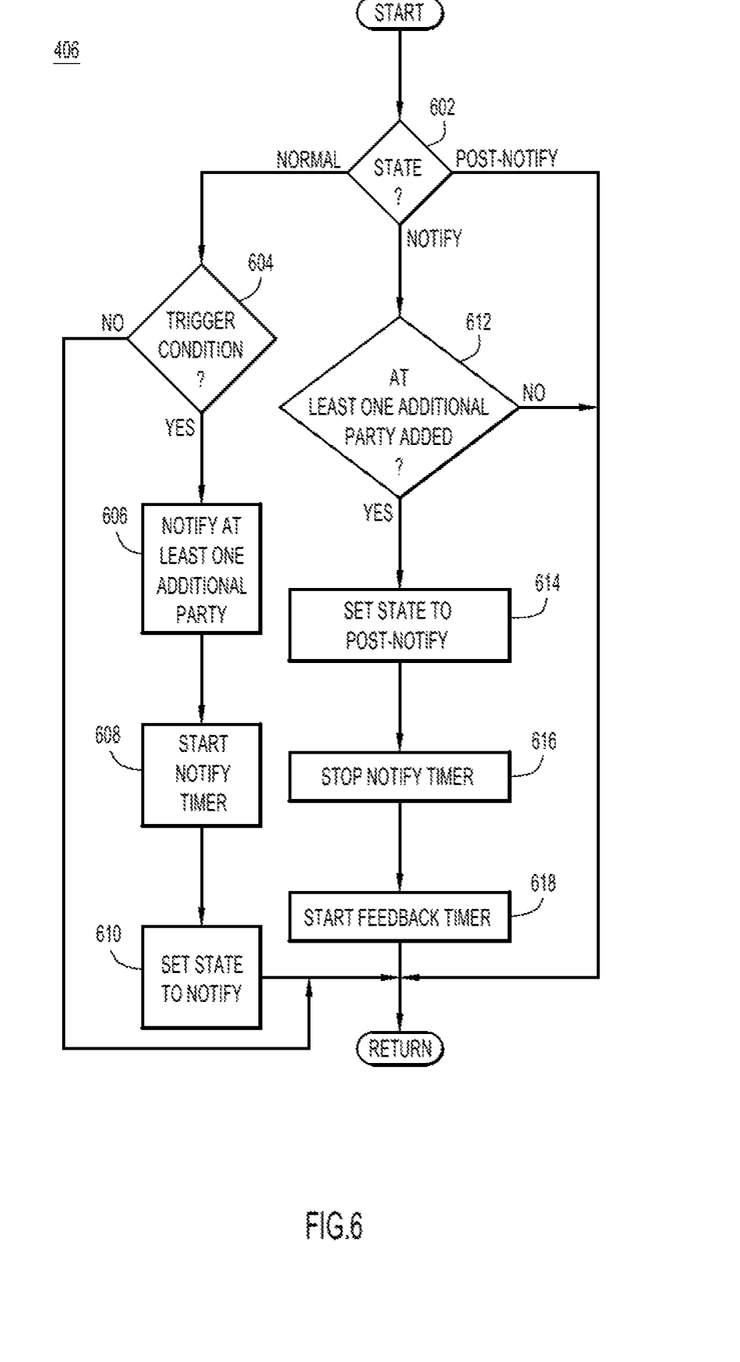
FIG. 6 is a flowchart that illustrates example processing that may be performed in embodiments during act 406 of FIG. 4.

FIGS. 4-6 are flowcharts that illustrate example processing during an operational phase of the various embodiments. The process may begin by preparing to analyze a discussion update of a first thread (act 402), which may be a new thread or an existing thread, followed by analysis of the thread (act 404).

FIG. 5 illustrates an example process for analyzing a thread according to act 404. The process may begin by performing natural language processing, including text analytics, with respect to a discussion of the thread (act 502). The model of conversation states built during the training phase as well as a UIMA pipeline may be used during the natural language processing. As a result of the natural language processing, a subject matter or topic of the discussion may be determined (act 504) as well as users involved in the discussion (act 506).

Next, one or more trigger conditions may be determined based on patterns learned during the training phase and the operational phase (act 508). Example trigger conditions may include, but not be limited to, use of stressful language such as, for example, use of key phrases including, but not limited to:
 I am frustrated with;
 I am annoyed about; and
 I am fed up with.

The process may then determine, based on the users involved and the subject matter, whether the thread is a new thread or an existing thread (act 510). If the thread is a new thread, then information about the new thread may be saved (act 512) and a state of the thread may be set to normal (act 513). The saved thread information may include information about determined trigger conditions, information about the users involved in the discussion (including information regarding one or more users who joined the discussion after being notified that involvement in the discussion may be beneficial), and information regarding whether any of the determined trigger conditions are now true. The process may then be completed.

If, during act 510, the thread is determined to be an existing thread, then the existing thread information may be updated. As previously mentioned, the thread information may include information regarding one or more users who joined the discussion after being notified that their involvement in the discussion may be beneficial, information regarding determined trigger conditions, and information regarding whether any of the determined trigger conditions are now true (act 514).

Returning to FIG. 4, the model of conversation states may be updated based on results of analyzing the thread (act 405). Next, a state machine may be executed (act 406). FIG. 6 is a flowchart illustrating example processing that may be performed during act 406. The process may begin by determining a state within a thread being processed (act 602). If the state is determined to be normal, then a determination may be made regarding whether any of the one or more triggering conditions exist (act 604). If no trigger conditions currently exist, then the process is completed. Otherwise, at least one additional party may be notified that involvement in the discussion may be beneficial (act 606). A determination of the at least one additional party to notify may be based on patterns discovered during the training phase and learned during the operational phase. The notification may be made via one or more techniques including, but not limited to, email, text message, and phone call. A notify timer may be started and set to a specific time period such as, for example, a day, 12 hours, or some other time period (act 608). The state of the discussion of the thread may then be set to notify (act 610). The process may then be completed.

If, during act 602, the state of the thread is determined to be the notify state, users involved in the discussion may be compared with users involved in the discussion from a previous analysis of the discussion to determine if any additional users joined the discussion, and whether any of the additional users include the at least one additional party who was notified that involvement in the discussion may be beneficial (act 612). If the at least one additional party did not join the discussion, then the process may be completed. Otherwise, the state of the thread may be set to post-notify (act of 614), the notify timer may be stopped (act 616), and a feedback timer may be started (act 618). The process may then be completed.

If, during act 602, the state of the thread is determined to be the post-notify state, no action is taken and the process may be completed.

Returning to FIG. 4, a determination may be made regarding whether any additional discussion update for a thread remains to be processed (act 408). If any discussion update for a thread remains to be processed, preparations are made to analyze a next thread (act 410) and acts 404 to 408 may be repeated.

If, during act 408, a determination is made that no discussion updates remain to be processed, then the process may wait a predetermined amount of time such as, for example, one day or a different time period (act 412) before repeating the process.

Figure 7:
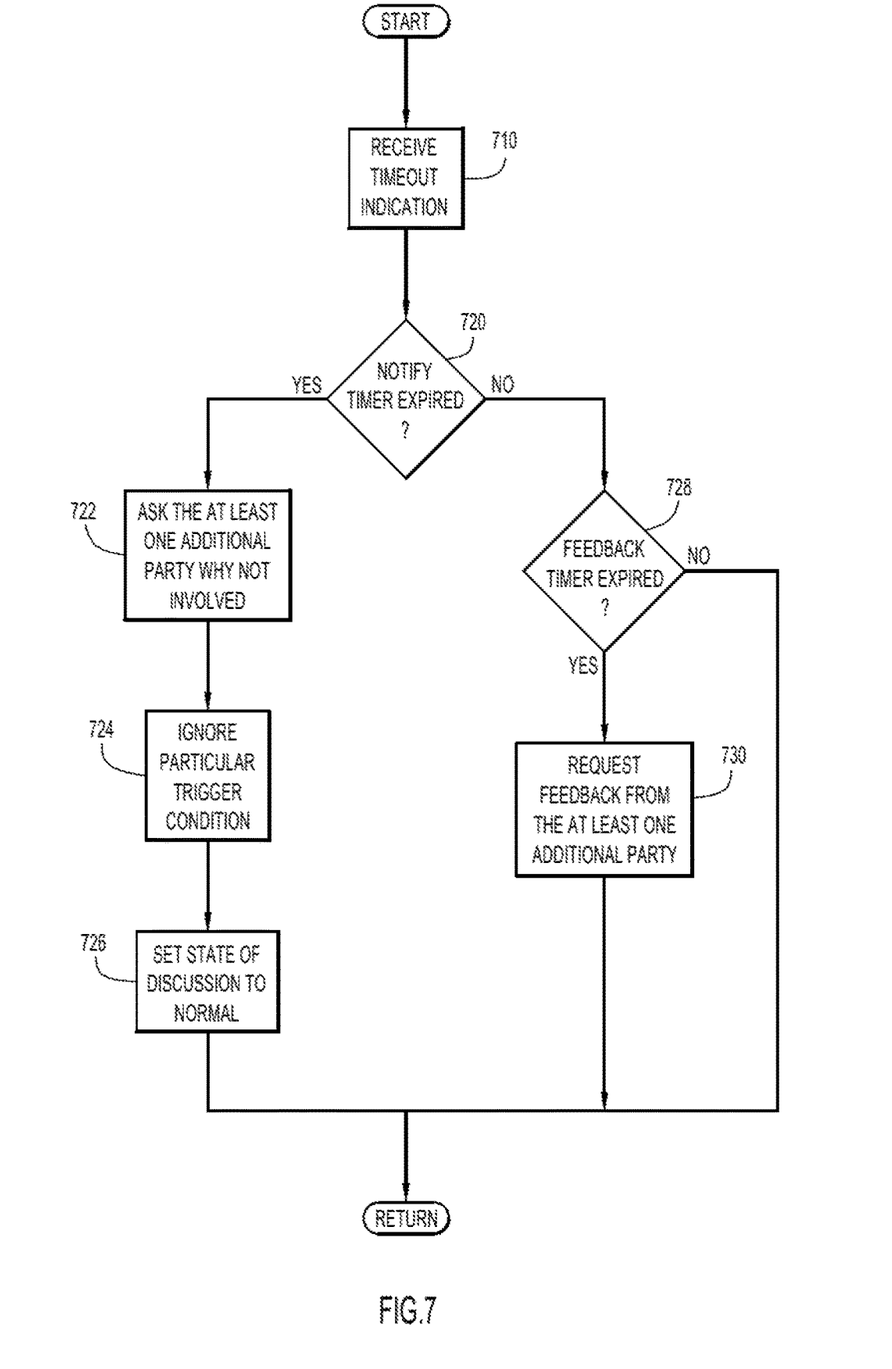
FIG. 7 is a flowchart that illustrates example processing that may be performed in embodiments to process a notify timer timeout indication and a feedback timer timeout indication.

FIG. 7 is a flowchart that illustrates an example process that may be performed when either the notify timer or the feedback timer expires. The process may begin by receiving a timeout indication (act 710). A determination may then be made regarding whether the timeout indication indicates that the notify timer for a thread expired (act 720). If the notify timer expired, then the at least one additional party who was previously notified regarding the discussion in the thread may be requested to provide a reason why that at least one additional party did not get involved in the discussion (act 722). The request may reach the at least one additional party via email, text message, phone call, or other techniques. A flag may be set to indicate that the particular trigger condition that caused the notification to be sent is to be ignored (act 724). The state of the discussion may then be set to normal (act 726) and the process may be completed.

If, during act 720, the notify timer was determined not to have expired, then a determination may be made regarding whether the feedback timer expired (act 728). If the feedback timer did not expire, then the timeout indication may be ignored and the process may be completed. Otherwise, if the feedback timer expired, feedback may be requested from the at least one additional party regarding the involvement in the discussion (act 730). The feedback request may be provided via email, text message, phone call, or other techniques. The process may then be completed.

Figure 8:
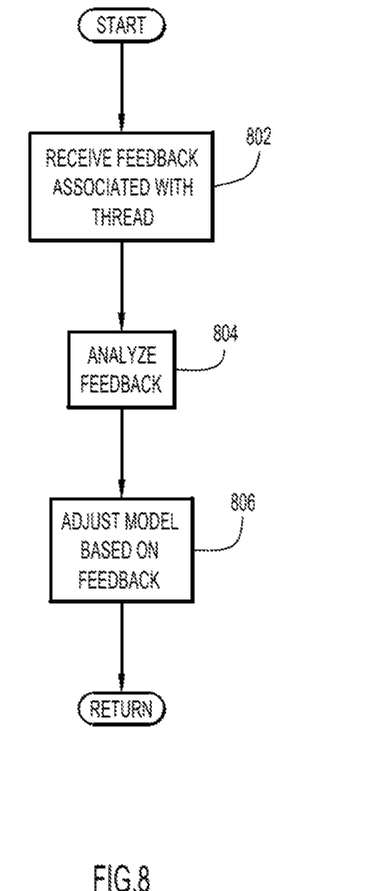
FIG. 8 is a flowchart that illustrates example processing that may be performed in embodiments regarding received feedback.

FIG. 8 is a flowchart that shows example processing regarding receipt and processing of feedback regarding a discussion of a thread. The process may begin with receiving feedback associated with a thread (act 802). Example feedback may include, but not be limited to: "My involvement in the discussion was quite useful."; "I helped resolve a technical issue not previously spotted by discussion participants."; "My involvement in the discussion was premature. There were no issues for me to resolve."

The feedback may then be analyzed using natural language processing rules and dictionaries 108 (act 804) and the model of conversation states may be adjusted or updated based on the feedback using conventional machine learning techniques (act 806).

In some embodiments, a timer may be restarted for a thread every time a discussion update for the thread is analyzed. The timer may be set to a time period such as, for example, one month, three months, 6 months, or another period of time. When the timer expires, indicating that no discussion on the thread occurred during the entire timer period, the discussion will be assumed to be completed and information concerning the discussion may be deleted from information regarding active discussions.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim as our invention:

1. A computer-implemented method comprising:
   analyzing, by at least one processing device during a training phase, discussions in threads to learn patterns that occur before at least one respective additional party joins the discussions in the threads, the learned patterns being based on at least one item from a group including a tone of a discussion, users involved in the discussion, and a subject matter of the discussion;
   creating, by the at least one processing device, a model of conversation states based on the patterns learned during the analyzing;
   periodically analyzing, by the at least one processing device during an operational phase, thread updates and new threads, based on the model, the periodically analyzing further comprising:
      determining, by the at least one processing device, one or more trigger conditions for respective threads based on the patterns learned during the training phase and the operational phase, and
   executing, by the at least one processing device, a state machine based on the model of conversation states and the determined one or more trigger conditions, the executing a state machine further comprising:
      determining whether a state of any respective threads or any respective new threads is in a first state and whether a corresponding triggering condition occurred with respect to any respective new discussions of the any respective threads or the any respective new threads, and
      when the state of the any respective threads or the any respective new threads is determined to be the first state and the corresponding triggering condition is determined to have occurred with respect to the corresponding respective new discussion, performing:
         notifying the at least one respective additional party, by the at least one processing device, to participate in the corresponding respective new discussion, and
         setting the state of the any respective threads or the any respective new threads to a second state, and
      when the state of the any respective threads or the any respective new threads is the second state and the at least one respective additional party is determined to have been added to the corresponding respective new discussion after the notifying, performing:
         starting a timer, and
         when the timer expires, performing:
            requesting, by the at least one processing device, feedback from the at least one respective additional party who was notified,
            receiving, by the at least one processing device, the feedback from the at least one respective additional party who was notified in response to the requesting of the feedback, and
            adjusting, by the at least one processing device, the model based on the feedback.

2. The computer-implemented method of claim 1, wherein the discussions and the new discussions are in unstructured text.

3. The computer-implemented method of claim 2, wherein the discussions and the new discussions are via one selected from a group including email messages, text messages, and a forum discussion.

4. The computer-implemented method of claim 1, further comprising:
   determining a subject matter of each of the respective new discussions;
   keeping track of each of the at least one respective additional party who joined the respective new discussions; and
   associating the subject matter of each of the respective discussions with the at least one respective additional party who joined the respective discussion.

5. The computer-implemented method of claim 4, further comprising:
   determining who to notify as the at least one respective additional party regarding the respective new discussion based on the subject matter of the respective new discussion, users involved in the respective new discussion, and feedback associated with at least one other discussion involving the at least one respective additional party.

6. The computer-implemented method of claim 4, further comprising:
   keeping track of users involved in each of the new discussions; and
   determining the corresponding triggering condition for each of the respective new discussions based, at least in part, on the users involved in the respective new discussions.

* * * * *